US012095378B2

(12) United States Patent
Yang et al.

(10) Patent No.: US 12,095,378 B2
(45) Date of Patent: Sep. 17, 2024

(54) BRIDGE CONVERTER AND METHOD OF CONTROLLING THE SAME

(71) Applicant: DELTA ELECTRONICS, INC., Taoyuan (TW)

(72) Inventors: Shang-Kay Yang, Taoyuan (TW); Hsien-Kai Wang, Taoyuan (TW); Yen-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 223 days.

(21) Appl. No.: 17/831,028

(22) Filed: Jun. 2, 2022

(65) Prior Publication Data

US 2023/0231485 A1  Jul. 20, 2023

(30) Foreign Application Priority Data

Jan. 14, 2022 (CN) .......................... 202210041553.6

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0032* (2021.05); *H02M 1/08* (2013.01); *H02M 1/0035* (2021.05)

(58) Field of Classification Search
CPC ........... H02M 1/0032; H02M 3/33592; H02M 1/0035; H02M 1/08
See application file for complete search history.

(56) References Cited

U.S. PATENT DOCUMENTS

| 9,979,308 B1* | 5/2018 | Meneses Herrera ........................ H02M 3/3376 |
| 2006/0139823 A1* | 6/2006 | Shoji ...................... H02M 1/34 361/56 |
| 2016/0141951 A1* | 5/2016 | Mao ........................ H02M 1/36 363/21.02 |
| 2017/0005585 A1 | 1/2017 | Shimura et al. |
| 2019/0068071 A1 | 2/2019 | Jia et al. |
| 2019/0341854 A1* | 11/2019 | Kohara .................... H02M 1/08 |
| 2020/0266704 A1* | 8/2020 | Chen ...................... H02M 3/156 |

FOREIGN PATENT DOCUMENTS

| CN | 106329962 A | 1/2017 |
| TW | 202019070 A | 5/2020 |

* cited by examiner

*Primary Examiner* — Harry R Behm
(74) *Attorney, Agent, or Firm* — Muncy, Geissler, Olds & Lowe, P.C.

(57) ABSTRACT

A bridge converter converts an input voltage into an output voltage, and includes a switching circuit, a transformer, a rectifying circuit, and a control module. The switching circuit includes a first switch and a second switch. The control module sets a first time period and a second time period. The control module provides a first control signal and a second control signal to control the switching circuit based on the output voltage. The control module fixes an operation frequency of the first control signal and the second control signal at the maximum frequency based on that the control module is set in a standby mode, and provides the first control signal and the second control signal in the first time period, and shields the first control signal and the second control signal in the second time period.

17 Claims, 12 Drawing Sheets

BRIDGE CONVERTER AND METHOD OF CONTROLLING THE SAME

BACKGROUND

Technical Field

The present disclosure relates to a bridge converter and a method of controlling the same, and more particularly to a bridge converter with reduced standby mode power consumption and a method of controlling the same.

Description of Related Art

The statements in this section merely provide background information related to the present disclosure and do not necessarily constitute prior art.

Due to the rapid development of the information industry in recent years, the power supply plays an important role, especially the power required by large-scale information equipment is gradually increasing so that the output power of the power supply is also gradually increasing in response to the load demand. Please refer to FIG. 1, the power supply adopts a multi-module converter parallel structure. In the multi-module design, the converter module 100A includes a plurality of converters 1A connected in parallel to each other. Since bridge converters are particularly suitable for high-power applications, the multi-module design is usually dominated by bridge converter circuits. Compared with the design of a single high-power converter for the power supply, the use of the multi-module design can avoid system shutdown due to damage to a single converter.

Figure 1:
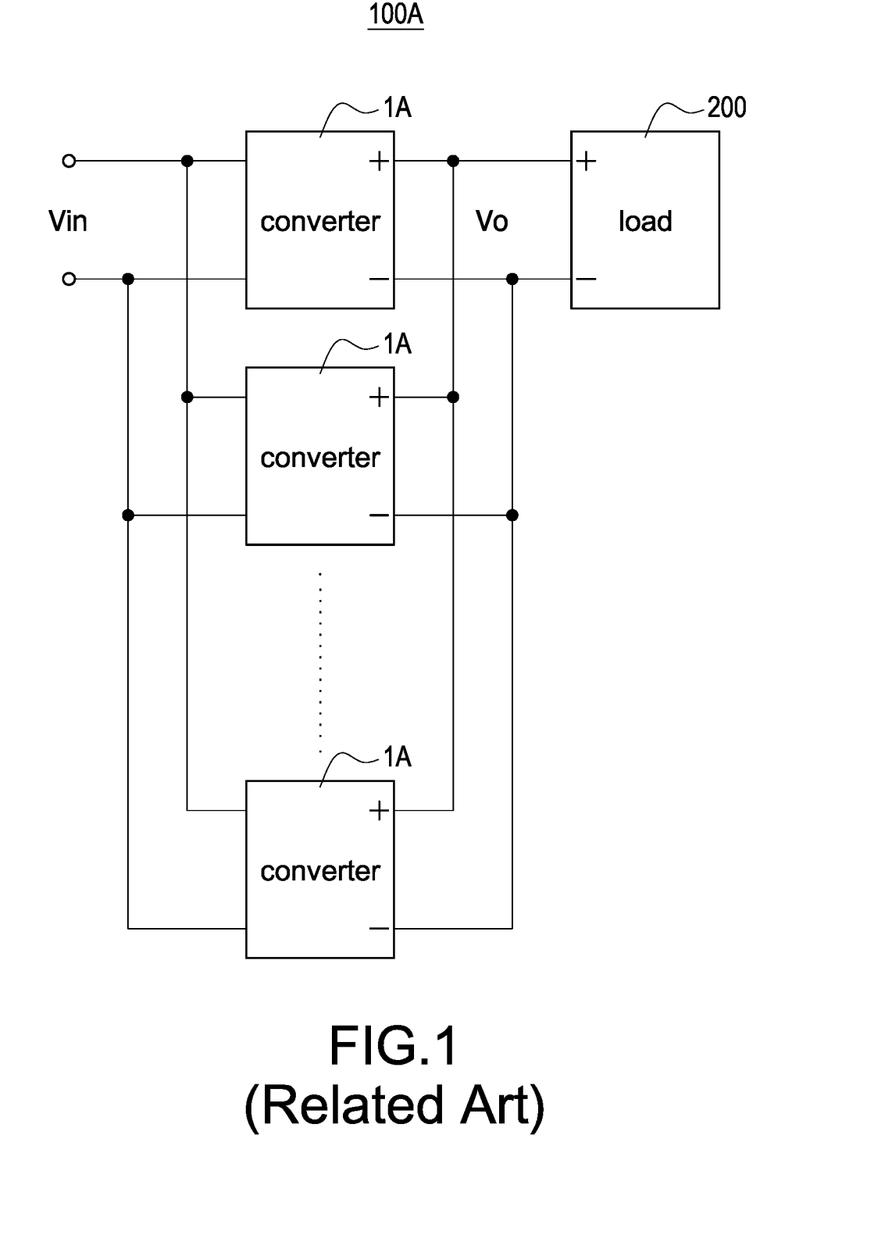
FIG. 1 is a block diagram of a power system structure having parallel-connected multi-module converters.

In an application where the plurality of converters 1A are connected in parallel, when the loading capacity of the load 200 is lower than a certain level, some of the converters 1A will be set in the standby mode and will not provide power. In this condition, the power required by the system is completely provided by the non-standby converters 1A so that the power supply operates in a higher efficiency condition.

In order to reduce the cost, the driver circuit in the converter 1A that provides the control signals of a plurality of power switches (not shown) usually uses the power switches and passive components to make the drive circuits share the drive power. However, during the standby period of the converter 1A, the power switches are in the disabled state for a long time so that part of the drive circuits are forcibly turned off since the voltage of the drive power is too low. Therefore, when the converter 1A is woken up, the drive power needs to be re-established so that the converters 1A can normally work. This process may cause the power switch to instantaneously withstand a large current stress or the output voltage Vo may not be able to supply enough energy in time, resulting in a deep voltage drop.

SUMMARY

In order to solve the above-mentioned problems, the present disclosure provides a bridge converter with a function of reducing power consumption in a standby mode. The bridge converter converts an input voltage into an output voltage. The bridge converter includes a switching circuit, a transformer, a rectifying circuit, and a control module. The switching circuit includes a first switch and a second switch. The transformer includes a primary side and a secondary side, and the primary side is coupled to the switching circuit. The rectifying circuit is coupled to the secondary side. The control module sets a first time period and a second time period, and provides a first control signal and a second control signal to control the switching circuit based on the output voltage. The first control signal controls the first switch, and the second control signal controls the second switch. The control module fixes an operation frequency of the first control signal and the second control signal at the maximum frequency based on that the control module is set in a standby mode, and provides the first control signal and the second control signal in the first time period and shields the first control signal and the second control signal in the second time period.

In order to solve the above-mentioned problems, the present disclosure provides a method of controlling a bridge converter. The bridge converter converts an input voltage into an output voltage, and includes a switching circuit, a transformer, and a rectifying circuit. The switching circuit includes a first switch controlled by a first control signal and a second switch controlled by a second control signal. The first control signal and the second control signal have an operation frequency. The method includes steps of: fixing the operation frequency at the maximum frequency based on a standby mode, and counting a first time period and a second time period; providing the first control signal and the second control signal based on the first time period, and shielding the first control signal and the second control signal based on the second time period.

The main purpose and effect of the present disclosure is that when the bridge converter enters the standby mode after receiving the first control command, the control unit still controls the switching circuit to switch in the first time period, and controls the switching circuit not to switch in the second time period. Therefore, the upper-arm drive circuit can be continuously driven so that when the bridge converter is woken up from the standby mode, the start-up time is not required to keep normally working.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
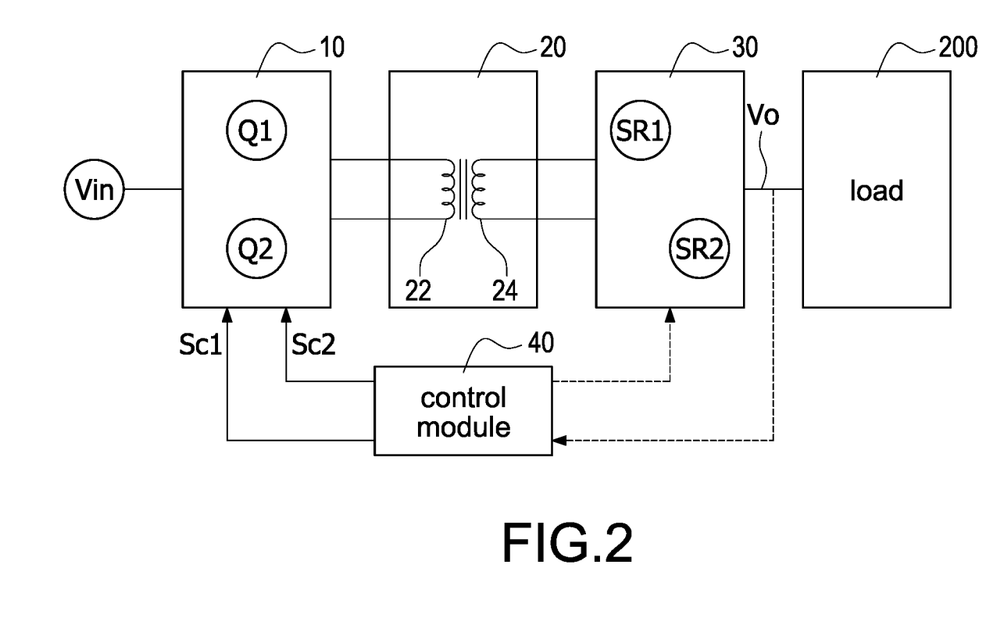
FIG. 2 is a block circuit diagram of a bridge converter according to the present disclosure.

Please refer to FIG. 2, which shows a block circuit diagram of a bridge converter according to the present disclosure, and also refer to FIG. 1. The bridge converter 1 receives an input voltage Vin and converters the input voltage Vin into an output voltage Vo, and the output voltage Vo is provided to supply power to a load 200. The bridge converter 1 includes a switching circuit 10, a transformer 20, a rectifying circuit 30, and a control module 40. The transformer 20 has a primary side 22 and a secondary side 24. The primary side 22 is coupled to the switching circuit 10, and the secondary side 24 is coupled to the rectifying circuit 30. The switching circuit 10 receives the input voltage Vin, and the switching circuit 10 includes at least a first switch Q1 and a second switch Q2. The rectifying circuit 30 is coupled between the secondary side 24 and the load 200, and the rectifying circuit 30 includes at least a first synchronous rectifying switch SR1 and a second synchronous rectifying switch SR2. When the bridge converter 1 normally works (operates), a turned-on timing of the first synchronous rectifying switch SR1 and that of the first switch Q1 of the switching circuit 10 may be the same, and a turned-on timing of the second synchronous rectifying switch SR2 and that of the second switch Q2 of the switching circuit 10 may be the same.

The control module 40 is coupled to the first switch Q1, the second switch Q2, the first synchronous rectifying switch SR1, and the second synchronous rectifying switch SR2. The control module 40 provides the first control signal Sc and the second control signal Sc2 to control the switching circuit 10 based on the feedback of the output voltage Vo of the bridge converter 1 (for example, but not limited to, through a feedback circuit). The control module 40 further sets a first time period and a second time period based on entering the standby mode to adjust the first control signal Sc1 and the second control signal Sc2. Specifically, the control module 40 is coupled to a controller (not shown) of a conversion module 100A, and the controller selectively adjusts the operation mode of the bridge converter 1 based on the demand of the load 200. In particular, the controller may be the management controller of the whole module, which may be an independent controller or the control module 40 of the master converter of the master/slave converter in parallel-connected multi-module converters 1.

When the controller of the conversion module 100A provides a control command of the standby mode to the control module 40 of a specific number of bridge converters 1, based on the control module 40 being set in the standby mode, the operation frequencies of the first control signal Sc and the second control signal Sc2 are fixed at the maximum frequency. The maximum frequency may be, for example, but not limited to, an upper limit of the operation frequency of the bridge converter 1, and is usually preset by the control module 40, or the maximum frequency may be the maximum frequency of operating the power converter in all operation modes. Afterward, the control module 40 provides the first control signal Sc and the second control signal Sc2 during the first time period, and shields the first control signal Sc and the second control signal Sc2 during the second time period so that when the bridge converter 1 is released from the standby mode by the conversion module 100A, there is no need to wait for the control module 40 to establish the driving power of the first switch Q1, and the specific operation is further explained below. In one embodiment, the control module 40 further provides the control signals to the first synchronous rectifying switch SR1 and the second synchronous rectifying switch SR2. In addition, the control signals provided to the different sides of the transformer 20 will pass through an isolation circuit, which is not the main technical feature of the present disclosure, and the detail description is omitted here for conciseness.

Figure 3A:
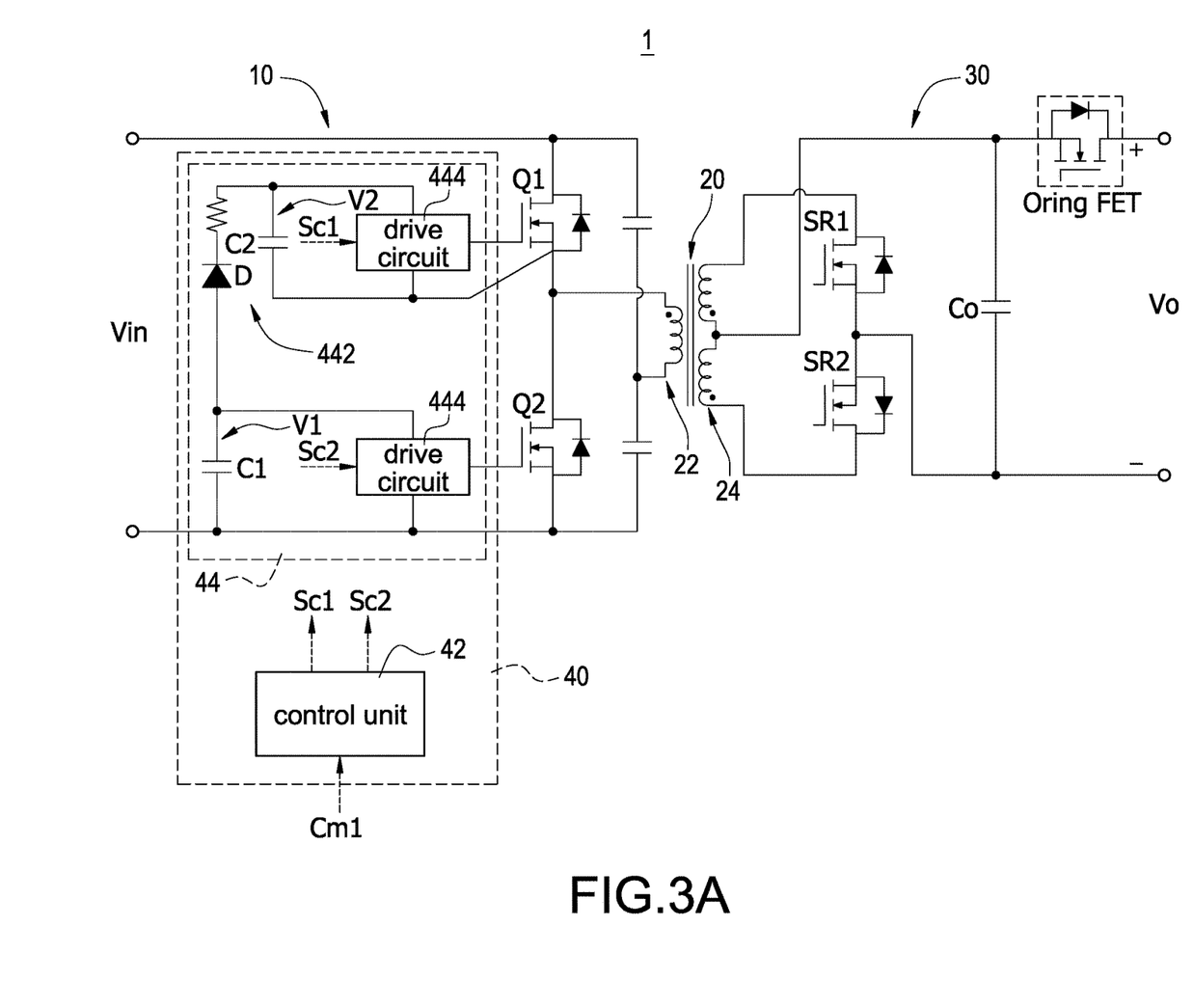
FIG. 3A is a block circuit diagram of the bridge converter with a half-bridge structure in a primary side of the bridge converter according to the present disclosure.

Please refer to FIG. 3A, which shows a block circuit diagram of the bridge converter with a half-bridge structure in a primary side of the bridge converter according to the present disclosure, and also refer to FIG. 1 and FIG. 2. The switching circuit 10 coupled to the primary side 22 in the bridge converter 1 is a half-bridge circuit structure, and the secondary side 24 and the rectifying circuit 30 in the bridge converter 1 form a center-tapped bridge rectifying circuit. Specifically, the rectifying circuit 30 includes the first synchronous rectifying switch SR1 and the second synchronous rectifying switch SR2, and the first synchronous rectifying switch SR1 and the second synchronous rectifying switch SR2 are respectively coupled to two ends of the secondary side 24 of the transformer 20. A node between the first synchronous rectifying switch SR1 and the second synchronous rectifying switch SR2 is a midpoint. The center-tap of the secondary side 24 and the midpoint are respectively coupled to two ends of an output capacitor Co and two ends of the load 200 to form the half-bridge rectifying circuit. The control module 40 includes a control unit 42 and a drive module 44. The drive module 44 includes a bootstrap circuit 442 and a drive circuit 444. The control unit 42 sets a first time period and a second time period, and provides a first control signal Sc1 and a second control signal Sc2 based on the output voltage Vo in the normal (operation) mode. The drive module 44 is coupled to a first switch Q1, a second switch Q2, and a control unit 42, and a first voltage V1 is used to supply power to an upper-arm drive circuit based on the second control signal Sc2 (for example, but not limited to, a pulse width modulation (PWM) signal of switching switches) with a first level (for example, but not limited to, a high level).

Specifically, the first voltage V1 may be supplied externally or internally by the bridge converter 1 and is provided to charge the first capacitor C1. The bootstrap circuit 442 is coupled to the first capacitor C1, and the bootstrap circuit 442 includes a diode D and a second capacitor C2. The first capacitor C1 is coupled to a drive circuit 444 that drives the second switch Q2 (referred to as a lower-arm drive circuit), and an anode of the diode D is coupled to the first capacitor C1. The second capacitor C2 is coupled to the drive circuit 444 that drives the first switch Q1 (referred to as the upper-arm drive circuit), and a cathode of the diode D is coupled to the second capacitor C2. When the second switch Q2 is turned on, the diode D is forward-biased, and the first voltage V1 stored on the first capacitor C1 charges the second capacitor C2 so that the second voltage V2 is generated/built on the second capacitor C2. When the second voltage V2 is less than a threshold value of an under-voltage lockout (UVLO) of the upper-arm drive circuit, the upper-arm drive circuit is turned off. Therefore, when the bridge converter 1 is woken up, the upper-arm drive circuit cannot operate. After the second switch Q2 is turned on and the second capacitor C2 is charged so that the second voltage V2 is greater than or equal to the threshold value of the UVLO, the upper-arm drive circuit starts up (about 40 microseconds) so that the upper-arm drive circuit can successfully drive the first switch Q1.

The main purpose and effect of the present disclosure is that when the bridge converter 1 enters the standby mode after receiving a first control command Cm1 for controlling the conversion of the standby mode of the bridge converter 1, the control unit 42 still switches the switching circuit 10 and turns off the rectifying circuit 30 so that the first voltage V1 on the first capacitor C1 charges the second capacitor C2 of the bootstrap circuit 442. Therefore, the second voltage V2 of the second capacitor C2 can be kept at a voltage level greater than the voltage level of the under-voltage lockout of the drive circuit so that the upper-arm drive circuit can continuously work. When the bridge converter 1 is woken up from the standby mode, the switching circuit 10 (especially the first switch Q1) can normally operate without a start-up time since the upper-arm drive circuit is not forced to be turned off. Therefore, at the moment of switching, the switching circuit 10 will not have a large current stress, or the output voltage Vo will not be able to supply enough energy in time to cause the voltage to drop too deep.

However, in the standby mode, the power consumption of the switching circuit 10 is low so that the voltage stored in the second capacitor C2 is not rapidly consumed. In this condition, since the switching circuit 10 does not need to continuously operate to maintain the voltage stored in the second capacitor C2, the control unit 42 also sets the second time period. The control unit 42 shields the first control signal Sc and the second control signal Sc2 in the second time period so that the switching circuit 10 does not switch, thereby reducing the power consumption of the bridge converter 1 and increasing the operation efficiency of the switching module 100A. In the second time period, since the first control signal Sc1 and the second control signal Sc2 are shielded, the voltage stored in the second capacitor C2 will be slowly and naturally consumed. The time length of the first time period and the second time period can be determined based on the capacity of the second capacitor C2, which belongs to an open-loop control. When the second voltage V2 is not within a predetermined time range, the first time period of charging is provided, and when the second voltage V2 is within the predetermined time range, the second time period of power saving is provided.

For the embodiment of FIG. 3A, unlike the related art, when the switch Oring FET is turned off or turned on in the standby mode, the voltage received by the upper-arm drive circuit (i.e., the second voltage V2) is lower than the voltage level of the under-voltage lockout of the drive circuit and is forced to be turned off, and therefore the switch Oring FET and a control circuit that controls the switch Oring FET may not be used. However, the switch Oring FET may still be installed on the output path to disconnect the output path when the bridge converter 1 fails, but when the bridge converter 1 operates in the standby mode, the switch Oring FET must be forced to be turned on so that the output ends of the bridge converters 1 connected in parallel are electrically connected.

Figure 3B:
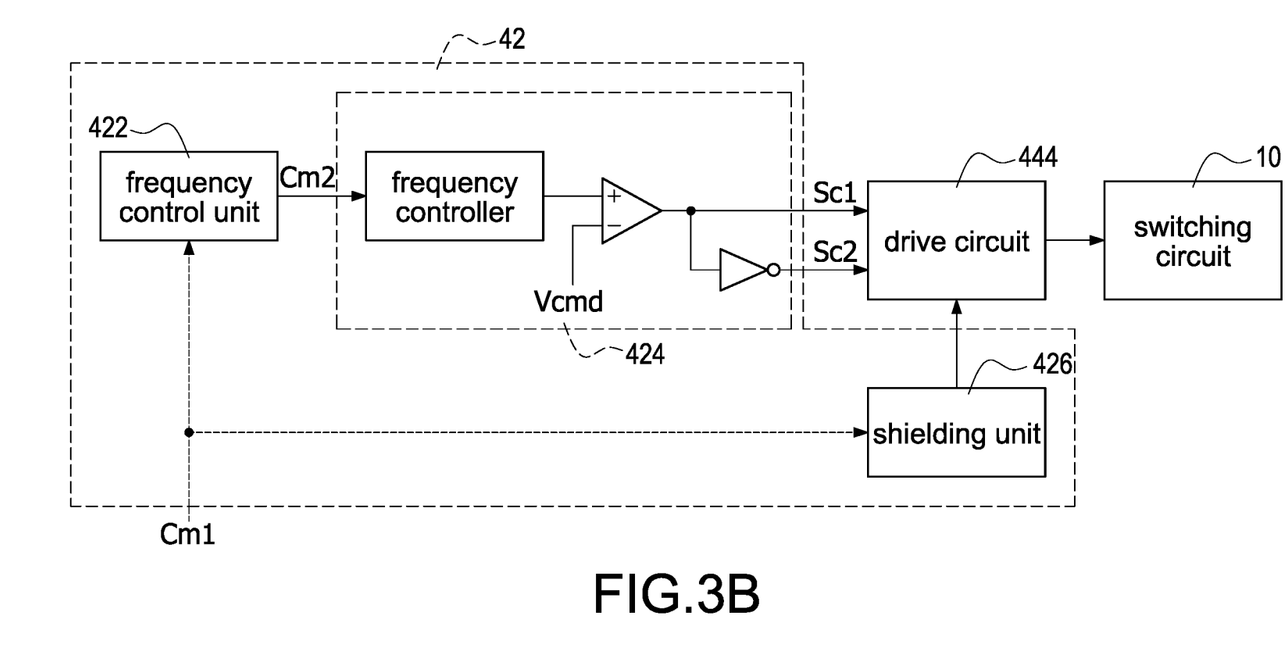
FIG. 3B is a block circuit diagram of a control unit of the bridge converter with the half-bridge structure in the primary side of the bridge converter according to the present disclosure.

Please refer to FIG. 3B, which shows a block circuit diagram of a control unit of the bridge converter with the half-bridge structure in the primary side of the bridge converter according to the present disclosure, and also refer to FIG. 1 to FIG. 3A. The control unit 42 includes a frequency control unit 422, a signal modulation unit 424, and a shielding unit 426. The frequency control unit 422 provides a second control command Cm2 corresponding to the maximum frequency based on that a first control command Cm1 (usually provided by a management controller) is received corresponding to the standby mode. In particular, the maximum frequency is the upper limit of the operation frequency of bridge converter 1. The signal modulation unit 424 is coupled to the frequency control unit 422 and a drive circuit 444 of a drive module 44. The signal modulation 424 modulates the first control signal Sc1 and the second control signal Sc2 complemented to each other based on the second control command Cm2, and provides the first control signal Sc and the second control signal Sc2 to the drive circuit 444. The shielding unit 426 is coupled to the drive circuit 444 of the drive module 44, and sets the first time period and the second time period. The shielding unit 426 starts to count the first time period and the second time period based on the first control command Cm1, and enables or disables the drive module 44 based on the first time period and the second time period. Furthermore, the shielding unit 426 can enable or disable the drive module 44 by outputting a shielding signal.

Figure 3C:
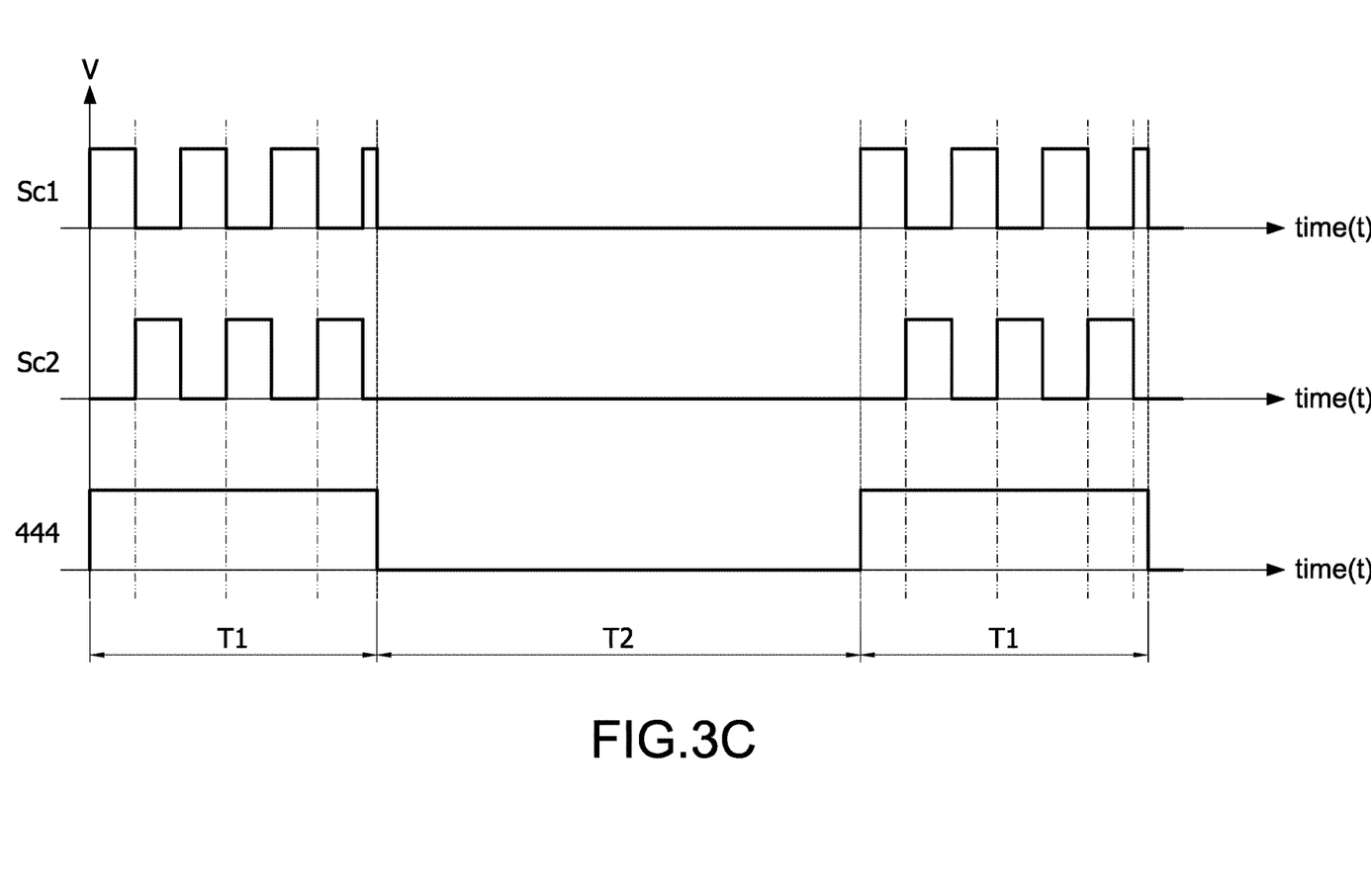
FIG. 3C is a schematic waveform of control signals of controlling the bridge converter with the half-bridge structure in the primary side of the bridge converter according to the present disclosure.

Please refer to FIG. 3C, which shows a schematic waveform of control signals of controlling the bridge converter with the half-bridge structure in the primary side of the bridge converter according to the present disclosure, and also refer to FIG. 1 to FIG. 3B. The frequency control unit 422 provides the second control command Cm2 corresponding to the maximum frequency based on receiving the first control command Cm1 corresponding to the standby mode so that the operation frequency $F_{SW}$ of the first control signal Sc and the second control signal Sc2 is fixed at the maximum frequency, for example, but not limited to, 60 kHz. The shielding unit 426 sets and counts a first time period T1 and a second time period T2. In the first time period T1, the shielding unit 426 enables the drive module 44 so that the first control signal Sc1 and the second control signal Sc2 provided by the control unit 42 can drive the first switch Q1 and the second switch Q2 by the drive module 44. On the contrary, in the second time period T2, the shielding unit 426 disables the drive module 44 so that the first control signal Sc1 and the second control signal Sc2 provided by the control unit 42 are shielded so that the first switch Q1 and the second switch Q2 cannot be driven by the drive module 44, and cycles repeat until the bridge converter 1 is notified to exit the standby mode.

In one embodiment, above waveform may be also called a burst mode. However, in this burst mode, the fixed first time period T1 and the second time period T2 are set based on the capacity of the second capacitor C2, instead of the conventional burst mode which is based on the magnitude of the output voltage Vo. Therefore, when the bridge converter 1 of the present disclosure enters the standby mode, it is not necessary to control the output voltage Vo to be stable within a specific voltage range.

Figure 4A:
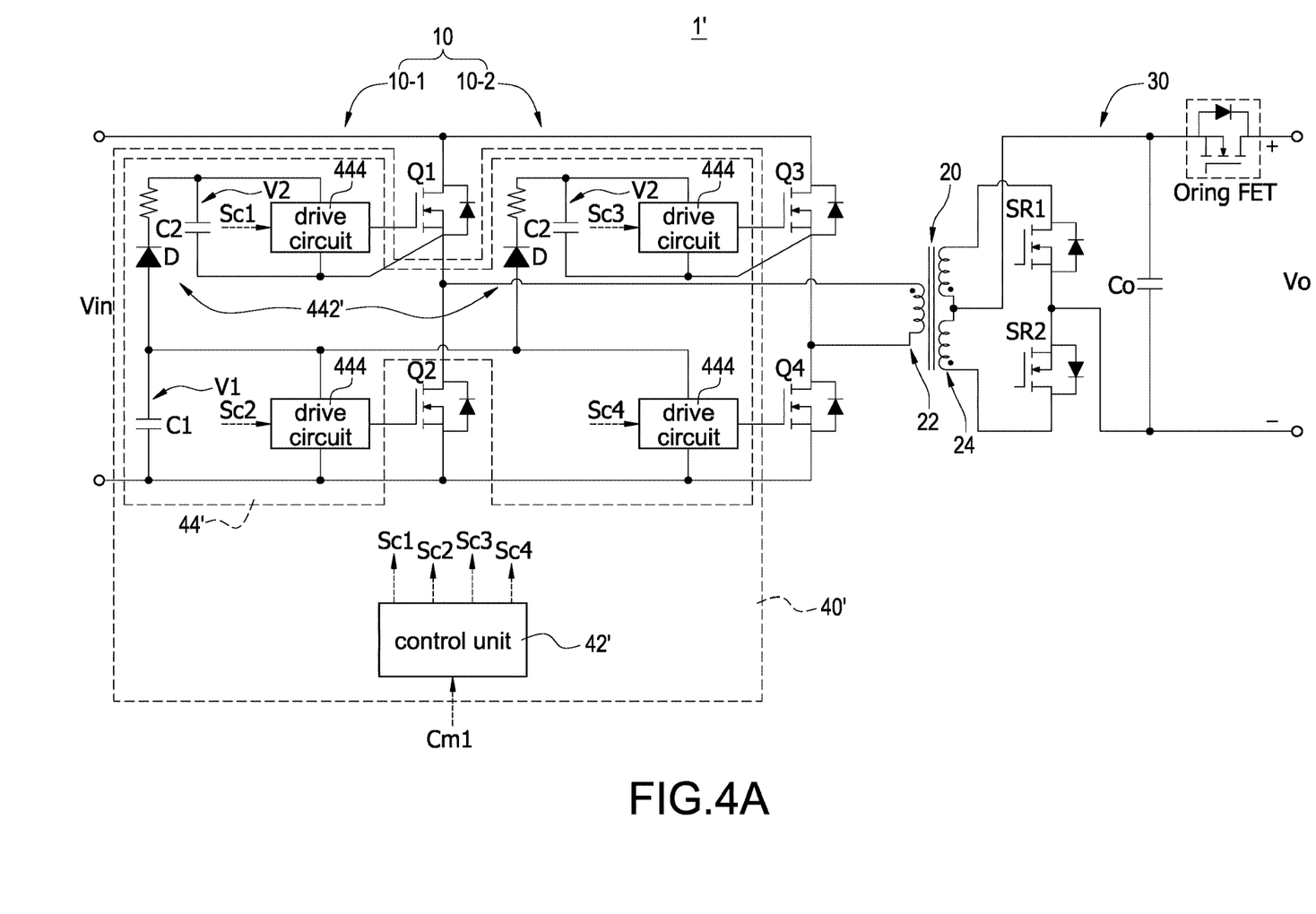
FIG. 4A is a block circuit diagram of the bridge converter with a full-bridge structure in the primary side of the bridge converter according to the present disclosure.

Please refer to FIG. 4A, and also refer to FIG. 1 to FIG. 3C. The difference between the bridge converter 1' in FIG. 4A and the bridge converter 1 in FIG. 3A is that the switching circuit 10 coupled to the primary side 22 in the bridge converter 1' is a full-bridge circuit structure, and the number of the second capacitors C2 and the drive circuits 444 in the bootstrap circuit 442' corresponds to the number of switches of the primary side 22. Specifically, the switching circuit 10' includes a first bridge arm 10-1 and a second bridge arm 10-2, and the first bridge arm 10-1 is connected in parallel to the second bridge arm 10-2. The second bridge arm 10-2 includes a third switch Q3 and a fourth switch Q4 connected in series. In addition to providing the first control signal Sc1 and the second control signal Sc2 to the drive module 44', the control unit 42' of the control module 40' also provides the third control signal Sc3 and the fourth control signal Sc4 to the drive module 44' based on the output voltage Vo. The drive circuit 444, which is coupled to the third switch Q3 and the fourth switch Q4, respectively receives the third control signal Sc3 and the fourth control signal Sc4, and the third switch Q3 and the fourth switch Q4 are driven based on the third control signal Sc3 and the fourth control signal Sc4. The control unit 42' provides control signals (Sc1-Sc4) in the first time period T1, and shields the control signals (Sc1-Sc4) in the second time period T2. In one embodiment, the circuit coupling relationships and operation modes not mentioned in FIG. 4A are the same as those in FIG. 3A, and the detail description is omitted here for conciseness.

Figure 4B:
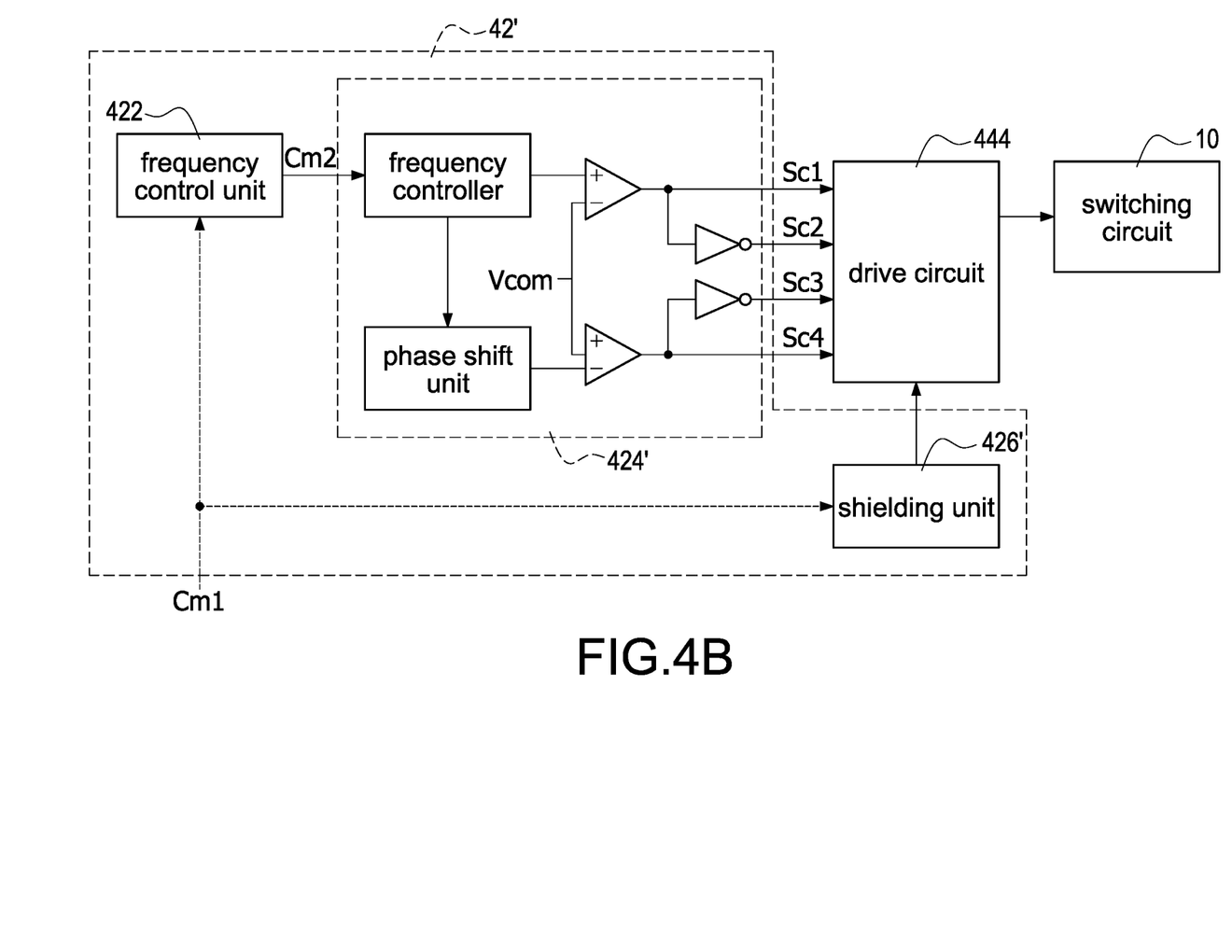
FIG. 4B is a block circuit diagram of the control unit of the bridge converter with the full-bridge structure in the primary side of the bridge converter according to the present disclosure.

Please refer to FIG. 4B, and also refer to FIG. 1 to FIG. 4A. The difference between the control unit 42' in FIG. 4B and the control unit 42 in FIG. 3B is that the signal modulation unit 424' modulates the first control signal Sc1 and the second control signal Sc2 complemented to each other based on the second control command Cm2, and modulates the third control signal Sc3 and the fourth control signal Sc4 complemented to each other based on the second control command Cm2, and fixes the operation frequency $F_{SW}$ of the above control signals (Sc1-Sc4) at the maximum frequency. When the bridge converter 1' does not enter the standby mode, the first control signal Sc1 and the fourth control signal Sc4 have the same phase, and the second control signal Sc2 and the third control signal Sc3 have the same phase.

The signal modulation unit 424' also phase-shifts the first control signal Sc1 and the fourth control signal Sc4 (or the second control signal Sc2 and the third control signal Sc3) based on the second control command Cm2 (corresponding to the standby mode). Specifically, the signal modulation unit 424' modulates the fourth control signal Sc4 with a phase-shift amount based on the first control signal Sc (by a phase-shift unit), and modulates the third control signal Sc3 with a phase-shift amount based on the second control signal Sc2 (by the phase-shift unit). The shielding unit 426' starts counting the first time period T1 and the second time period T2 based on the first control command Cm1, and enables or disables the drive module 44' based on the first time period T1 and the second time period T2. When the drive module 44' is enabled, the control signals (Sc1-Sc4) can drive the switching circuit 10 through the drive module 44'. On the contrary, when the drive module 44' is disabled, the control signals (Sc1-Sc4) cannot drive the switching circuit 10 through the drive module 44'. In one embodiment, the circuit coupling relationships and operation modes not mentioned in FIG. 4B are the same as those in FIG. 3B, and the detail description is omitted here for conciseness.

Figure 4C:
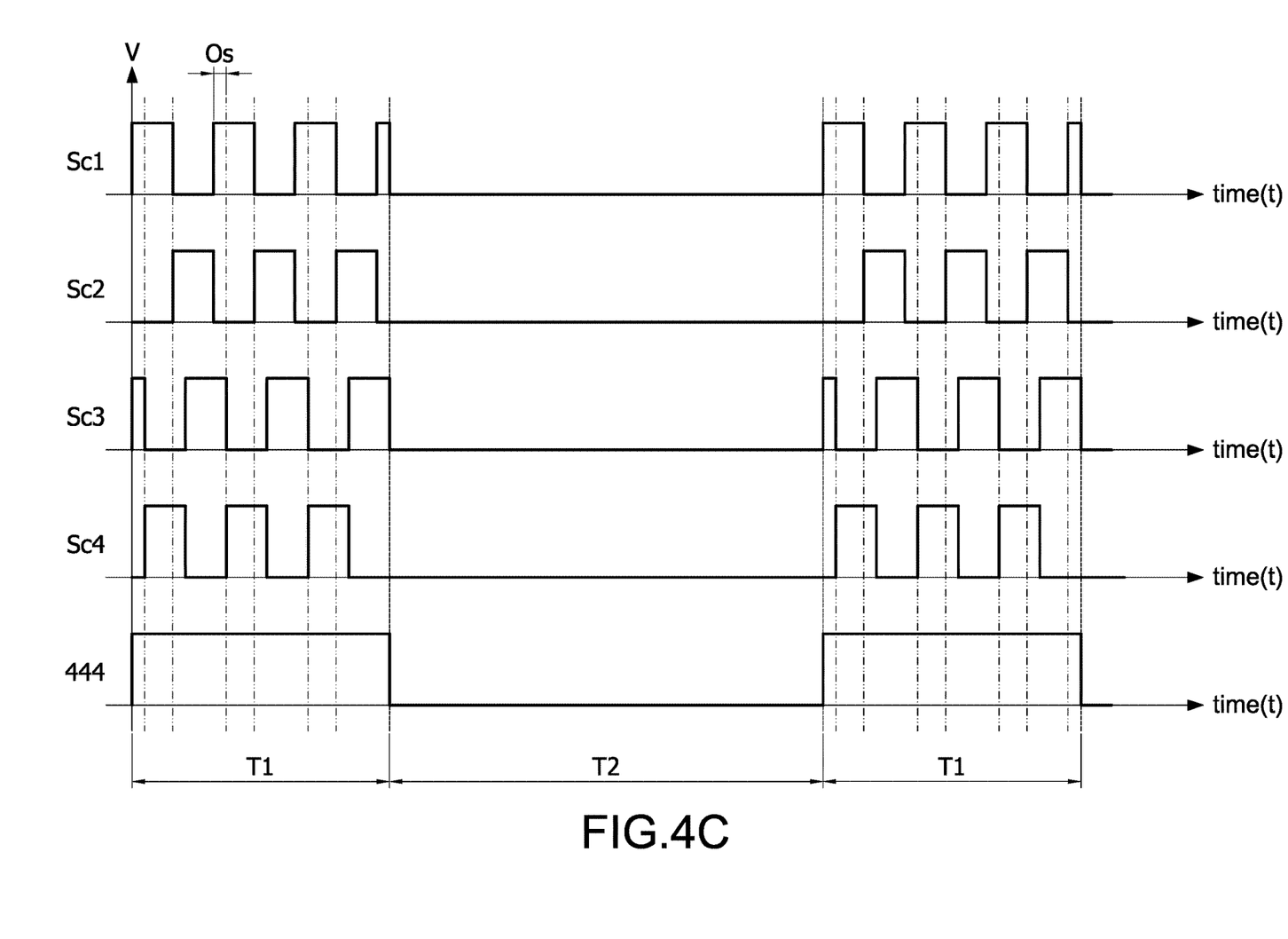
FIG. 4C is a schematic waveform of control signals of controlling the bridge converter with the full-bridge structure in the primary side of the bridge converter according to a first embodiment of the present disclosure.
Figure 4D:
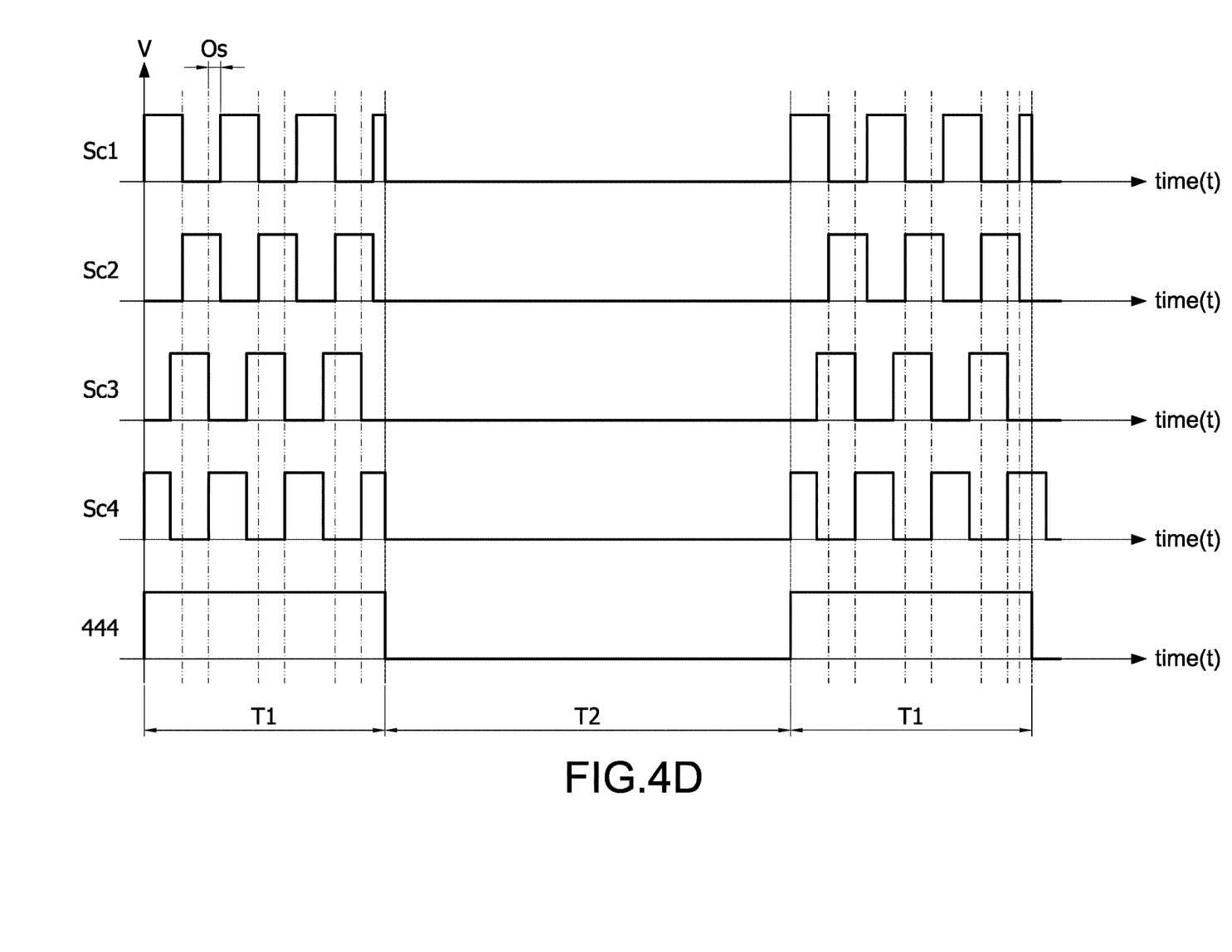
FIG. 4D is a schematic waveform of control signals of controlling the bridge converter with the full-bridge structure in the primary side of the bridge converter according to a second embodiment of the present disclosure.

Please refer to FIG. 4C and FIG. 4D, and also refer to FIG. 1 to FIG. 4B. In FIG. 4C and FIG. 4D, the operation frequencies $F_{SW}$ of the control signals (Sc1-Sc4) are fixed at the maximum frequency, for example, but not limited to 60 kHz, and the control signals (Sc1-Sc4) are phase-shifted to generate an offset amount Os. In FIG. 4C, the control unit 42' of the control module 40' controls the phase of the first control signal Sc to lead the phase of the fourth control signal Sc4, and controls the phase of the second control signal Sc2 to lead the phase of the third control signal Sc3. On the contrary, in FIG. 4D, the control unit 42' controls the phase of the first control signal Sc1 to lag the phase of the fourth control signal Sc4, and controls the phase of the second control signal Sc2 to lag the phase of the third control signal Sc3. In one embodiment, the circuit coupling relationships and operation modes not mentioned in FIG. 4C and FIG. 4D are the same as those in FIG. 3C, and the detail description is omitted here for conciseness.

Further, by generating the offset amount Os through the phase-shift control signals (Sc1-Sc4), the switching of the switches (Q1-Q4) can be soft switching, that is, the switching timing of the switches Q1-Q4 falls at zero voltage or zero current. Therefore, the voltage stress or current stress during switching of the switches (Q1-Q4) can be further reduced to save power consumption. In particular, the magnitude of the offset amount Os of the control signals (Sc1-Sc4) may be designed, for example, but not limited to, 60 degrees based on the magnetic offset phenomenon of the transformer 20.

Figure 5:
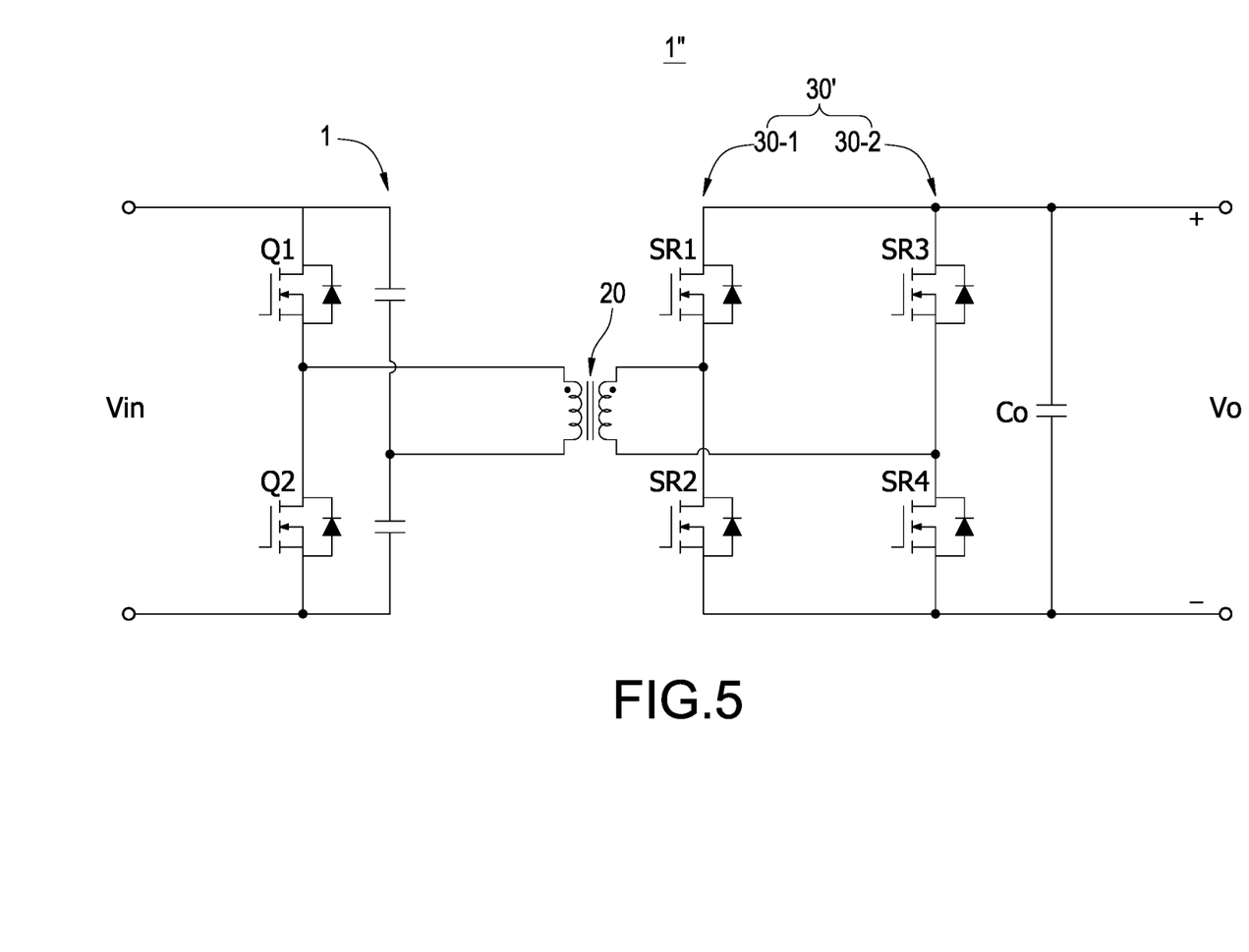
FIG. 5 is a block circuit diagram of the bridge converter with the full-bridge structure in a secondary side of the bridge converter according to the present disclosure.

Please refer to FIG. 5, and also refer to FIG. 1 to FIG. 4D. The difference between the bridge converter 1" in FIG. 5 and the bridge converters 1,1' in FIG. 3A and FIG. 4A is that the rectifying circuit 30' is a full-bridge rectifying circuit having a first synchronous rectifying bridge arm 30-1 and a second synchronous rectifying bridge arm 30-2, and the first synchronous rectifying bridge arm 30-1 is connected in parallel to the second synchronous rectifying bridge arm 30-2 and the output capacitor Co. It can be known from the content disclosed in the present disclosure that the switching circuit 10 of the primary side 22 and the rectifying circuit 30 of the secondary side 24 of the bridge converter 1 may be arbitrarily matched with a full-bridge or half-bridge circuit, which can be selected according to actual needs. Moreover, the present disclosure is applicable to resonant converters, such as LC, LLC, etc. with a resonant tank in addition to half-bridge/full-bridge circuits. Similarly, the control unit 42 may select the operation frequency to be variable frequency or fixed frequency based on the circuit structure of the half-bridge/full-bridge circuits. Under the circuit structure of the resonant converter such as LLC, the operation frequency is usually variable, and the control unit 42 can acquire the operation frequency through the feedback of the output voltage. On the contrary, the non-resonant bridge converter usually operates at a fixed frequency, and the control unit 42 may be used to preset the operation frequency.

Figure 6A:
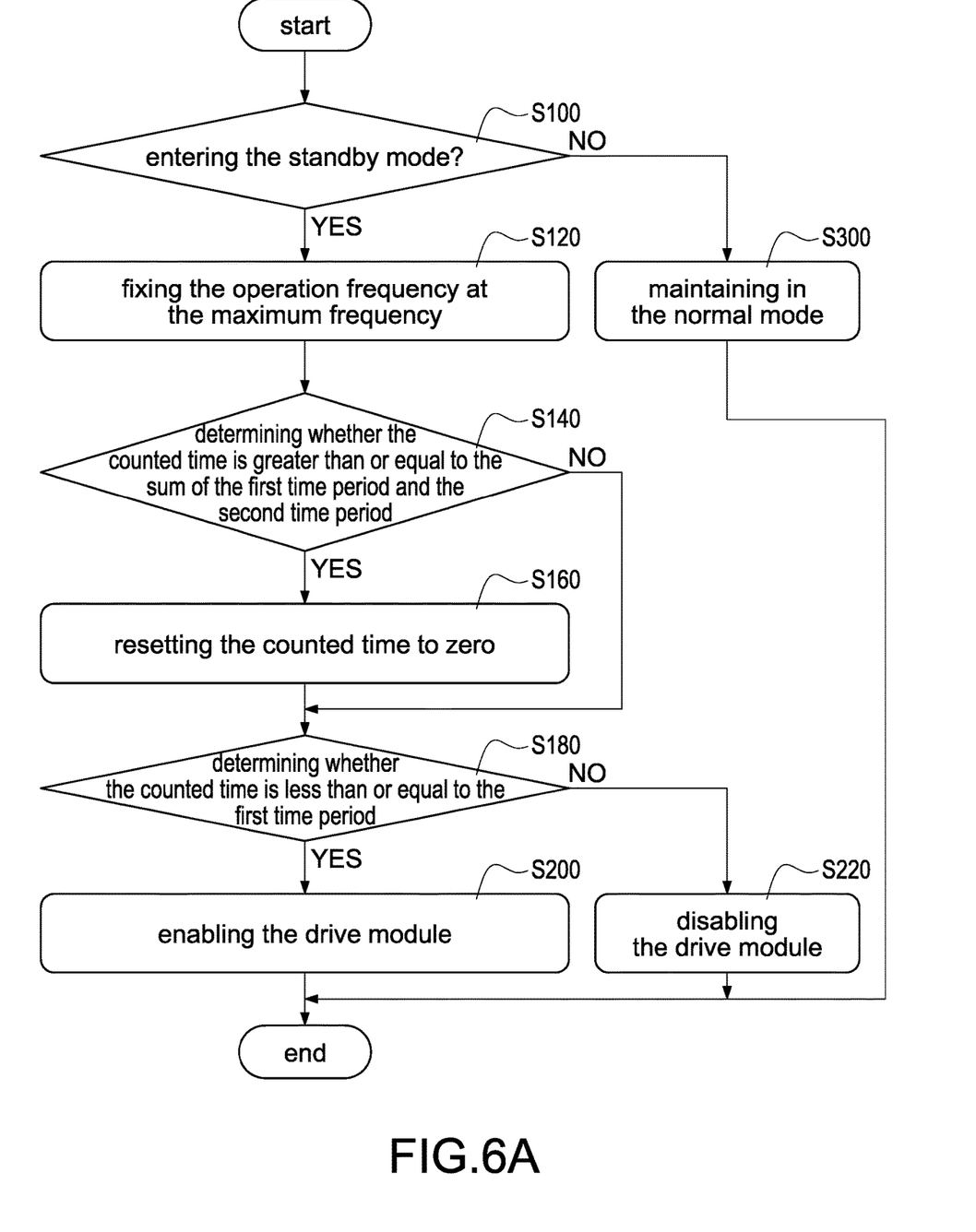
FIG. 6A is a flowchart of a method of controlling the bridge converter with the half-bridge structure in the primary side of the bridge converter according to the present disclosure.

Please refer to FIG. 6A, and also refer to FIG. 1 to FIG. 5. The method of controlling the bridge converter with the half-bridge structure in the primary side of the bridge converter includes steps of: determining whether to enter the standby mode (S100). When the first control command Cm1 is received, it represents that the bridge converter 1 enters the standby mode, and fixing the operation frequency, by the control unit 42, at the maximum frequency (S120). Afterward, determining whether the counted time is greater than or equal to the sum of the first time period and the second time period (S140). When the counted time is greater than or equal to the sum of the first time period T1 and the second time period T2, the counted time is rest to zero (S160). On the contrary, determining whether the counted time is less than or equal to the first time period (S180). When the shielding unit 426 determines that the counted time is less than or equal to the first time period T1, the shielding unit 426 enables the drive module (S200) so that the first control signal Sc and the second control signal Sc2 provided by the control unit 42 can drive the first switch Q1 and the second switch Q2 by the drive module 44. On the contrary, it represents that the counted time enters the second time period T2, and the shielding unit 426 disables the drive module (S220) so that the first control signal Sc and the second control signal Sc2 provided by the control unit 42 are shielded and the switching circuit 10 cannot be driven by the drive module 44. When the determination result in step (S100) is "No", the normal mode is maintained (S300). The control unit 42 controls the switching circuit 10 to normally switch so as to control the bridge converter 1 to convert the input voltage Vin into the output voltage Vo.

Figure 6B:
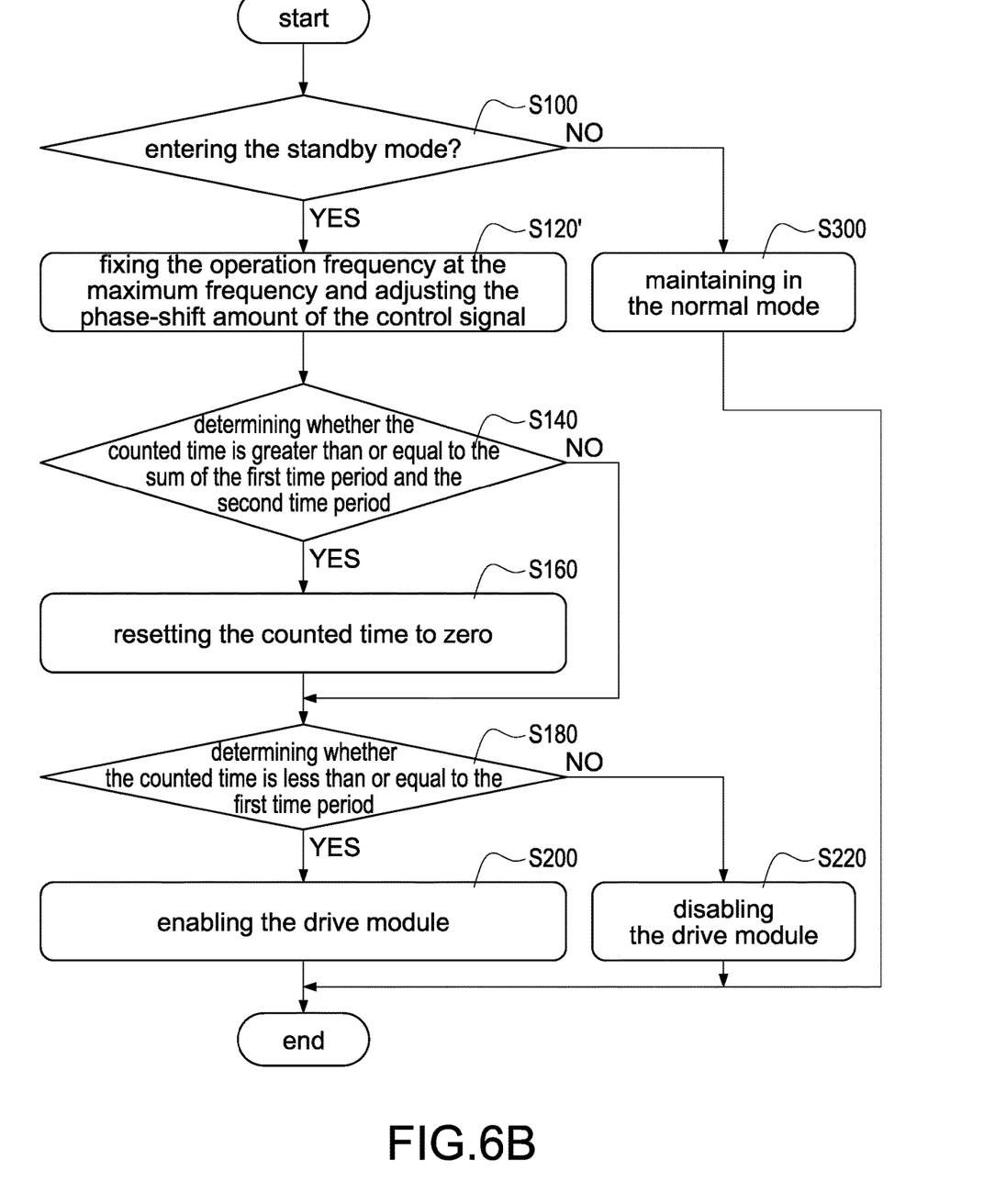
FIG. 6B is a flowchart of a method of controlling the bridge converter with the full-bridge structure in the primary side of the bridge converter according to the present disclosure.

Please refer to FIG. 6B, and also refer to FIG. 1 to FIG. 5. The difference between the control method of FIG. 6B and the control method of FIG. 6A is that the control method of FIG. 6B is applicable to a bridge converter with the full-bridge structure in the primary side of the bridge converter. In step (S120'), the control unit fixes the operation frequency at the maximum frequency and adjusts the phase-shift amount of the control signal. Specifically, the control unit 42' phase-shifts the first control signal Sc and the fourth control signal Sc4 based on the second control command Cm2 (corresponding to the standby mode), and phase-shifts the second control signal Sc2 and the third control signal Sc3 so that the control unit 42' can control the switches (Q1-Q4) to perform soft switching.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A bridge converter, configured to convert an input voltage into an output voltage, the bridge converter comprising:
a switching circuit, comprising a first switch and a second switch,
a transformer, comprising a primary side and a secondary side, and the primary side coupled to the switching circuit,
a rectifying circuit, coupled to the secondary side, and
a control module, configured to provide a first control signal and a second control signal to control the switching circuit based on the output voltage, comprising a drive module, coupled to the first switch and the second switch, and configured to provide a voltage by a capacitor to turn on the first switch based on the first control signal with a first level,
wherein the first control signal controls the first switch, and the second control signal controls the second switch; the control module fixes an operation frequency of the first control signal and the second control signal at a maximum frequency based on that the control module is set in a standby mode, and provides the first control signal and the second control signal in a first time period of the standby mode and disables the first control signal and the second control signal in a second time period of the standby mode, and
wherein the control module determines the first time period and the second time period based on a capacitance of the capacitor, and the first time period and the second time period are independent of a magnitude of the output voltage.

2. The bridge converter as claimed in claim 1, wherein the control module further comprises:
a control unit, configured to set the first time period and the second time period, and provide the first control signal and the second control signal based on the output voltage.

3. The bridge converter as claimed in claim 2, wherein the control unit comprises:
a frequency control unit, configured to provide a second control command corresponding to the maximum frequency when a first control command is received corresponding to the standby mode,
a signal modulation unit, coupled to the frequency control unit and the drive module, and configured to modulate the first control signal and the second control signal complemented to each other based on the second control command, and
a shielding unit, coupled to the drive module,
wherein the shielding unit counts the first time period and the second time period based on the first control command, and enables or disables the drive module based on the first time period and the second time period.

4. The bridge converter as claimed in claim 1, wherein the switching circuit comprises:
a first bridge arm, comprising the first switch and the second switch connected in series, and
a second bridge arm, connected in parallel to the first bridge arm, and comprising a third switch and a fourth switch connected in series,
wherein the control module provides a third control signal to control the third switch and provides a fourth control signal to control the fourth switch based on the output voltage; the control module fixes the operation frequency of the third control signal and the fourth control signal at the maximum frequency based on that the control module is set in the standby mode; the control module provides the third control signal and the fourth control signal in the first time period and shields the third control signal and the fourth control signal in the second time period; the first control signal and the fourth control signal have a phase-shift amount, and the second control signal and the third control signal have the phase-shift amount.

5. The bridge converter as claimed in claim 4, wherein the control module further comprises:
a control unit, configured to set the first time period and the second time period, and provide the first control signal, the second control signal, the third control signal, and the fourth control signal, and
wherein the drive module is further coupled to the second bridge arm, and is further configured to provide the voltage to turn on the third switch based on the third control signal with the first level.

6. The bridge converter as claimed in claim 5, wherein the control unit comprises:

a frequency control unit, configured to provide a second control command corresponding to the maximum frequency when a first control command is received corresponding to the standby mode, a signal modulation unit, coupled to the frequency control unit, and configured to modulate the first control signal and the second control signal complemented to each other based on the second control command, modulate the first control signal and the fourth control signal having the phase-shift amount based on the second control command, and modulate the second control signal and the third control signal having the phase-shift amount based on the second control command, and a shielding unit, coupled to the drive module, wherein the shielding unit counts the first time period and the second time period based on the first control command, and enables or disables the drive module based on the first time period and the second time period.

7. The bridge converter as claimed in claim 4, wherein the control module controls a phase of the first control signal to lead a phase of the fourth control signal, and controls a phase of the second control signal to lead a phase of the third control signal.

8. The bridge converter as claimed in claim 4, wherein the control module controls a phase of the first control signal to lag a phase of the fourth control signal, and controls a phase of the second control signal to lag a phase of the third control signal.

9. The bridge converter as claimed in claim 1, wherein the transformer is a center-tapped transformer, and the rectifying circuit comprises a first synchronous rectifying switch and a second synchronous rectifying switch; the first synchronous rectifying switch and the second synchronous rectifying switch are respectively coupled to two ends of the secondary side to form a half-bridge rectifying circuit.

10. The bridge converter as claimed in claim 1, wherein the transformer is coupled to a first synchronous rectifying bridge arm formed by a first synchronous rectifying switch and a second synchronous rectifying switch connected in series, and is coupled to a second synchronous rectifying bridge arm formed by a third synchronous rectifying switch and a fourth synchronous rectifying switch connected in series to form a full-bridge rectifying circuit.

11. A method of controlling a bridge converter, the bridge converter configured to convert an input voltage into an output voltage, and comprising a switching circuit, a drive module, a transformer, and a rectifying circuit; the switching circuit comprising a first switch controlled by a first control signal and a second switch controlled by a second control signal, and the first control signal and the second control signal having an operation frequency, the method comprising steps of:

providing a voltage by a capacitor of the drive module to drive the first switch based on the first control signal with a first level, determining a first time period and a second time period of a standby mode based on a capacitance of the capacitor, fixing the operation frequency at a maximum frequency based on the standby mode, and counting the first time period and the second time period, providing the first control signal and the second control signal based on the first time period, and disabling the first control signal and the second control signal based on the second time period.

12. The method of controlling the bridge converter as claimed in claim 11, further comprising steps of:

modulating the first control signal and the second control signal complemented to each other based on a first control command is received corresponding to the standby mode, and counting the first time period and the second time period based on the first control command, and enabling or disabling the drive module based on the first time period and the second time period.

13. The method of controlling the bridge converter as claimed in claim 11, wherein the switching circuit further comprises a third switch controlled by a third control signal and a fourth switch controlled by a fourth control signal, and the method further comprises steps of:

fixing the operation frequency of the third control signal and the fourth control signal at the maximum frequency based on the standby mode, adjusting a phase-shift amount of the first control signal and the fourth control signal, and adjusting the phase-shift amount of the second control signal and the third control signal, and providing the third control signal and the fourth control signal in the first time period, and shielding the third control signal and the fourth control signal in the second time period.

14. The method of controlling the bridge converter as claimed in claim 13, further comprising steps of:

modulating the first control signal and the second control signal complemented to each other based on a first control command is received corresponding to the standby mode, modulating the first control signal and the fourth control signal having the phase-shift amount, and modulating the second control signal and the third control signal having the phase-shift amount, and counting the first time period and the second time period based on the first control command, and enabling or disabling the drive module based on the first time period and the second time period.

15. The method of controlling the bridge converter as claimed in claim 13, further comprising steps of:

providing the voltage by the drive module to drive the third switch based on the third control signal with the first level.

16. The method of controlling the bridge converter as claimed in claim 13, further comprising a step of:

controlling a phase of the first control signal to lead a phase of the fourth control signal, and controlling a phase of the second control signal to lead a phase of the third control signal.

17. The method of controlling the bridge converter as claimed in claim 13, further comprising a step of:

controlling a phase of the first control signal to lag a phase of the fourth control signal, and controlling a phase of the second control signal to lag a phase of the third control signal.

* * * * *